United States Patent [19]

Pühringer

[11] 4,386,134

[45] May 31, 1983

[54] PROCESS FOR IMPREGNATING CELLULOSIC MATERIALS AND PRODUCTS HEREBY OBTAINED

[76] Inventor: Josef Pühringer, Björnkällevägen 35, Täby 183 64, Sweden

[21] Appl. No.: 220,049

[22] PCT Filed: Apr. 23, 1980

[86] PCT No.: PCT/SE80/00124

§ 371 Date: Dec. 11, 1980

§ 102(e) Date: Dec. 11, 1980

[87] PCT Pub. No.: WO80/02249

PCT Pub. Date: Oct. 30, 1980

[30] Foreign Application Priority Data

| | | | |
|---|---|---|---|
| Apr. 24, 1979 | [SE] | Sweden | 7903581 |
| Apr. 30, 1979 | [SE] | Sweden | 7903786 |
| Apr. 30, 1979 | [SE] | Sweden | 7903787 |
| Jun. 6, 1979 | [SE] | Sweden | 7904931 |

[51] Int. Cl.[3] .......... B05D 3/02; B32B 9/06; B32B 15/04

[52] U.S. Cl. .......... 428/447; 427/387; 427/393; 428/452

[58] Field of Search .......... 427/387, 393, 397; 428/447, 452

[56] References Cited

U.S. PATENT DOCUMENTS

| | | | |
|---|---|---|---|
| 2,758,946 | 8/1956 | Spalding et al. | 117/135.5 |
| 3,258,382 | 6/1966 | Vincent | 427/387 X |
| 3,473,953 | 10/1969 | Hider | 117/76 |
| 4,069,368 | 1/1978 | Deyak et al. | 428/447 |
| 4,151,327 | 4/1979 | Lawton | 428/447 |
| 4,170,690 | 10/1979 | Armbruster et al. | 428/447 |

FOREIGN PATENT DOCUMENTS

| | | |
|---|---|---|
| 1277548 | of 0000 | Fed. Rep. of Germany . |
| 1359758 | of 0000 | France . |
| 1521877 | of 0000 | United Kingdom . |

OTHER PUBLICATIONS

Chemical Abstracts, vol. 83, 1975, 207810y.
Chemical Abstracts, vol. 86, 1977, 86:18236s.
F, Textiles, Paper, Cellulose, 55821B/30, 50-626-951, 8-18-1978.
Chemical Abstracts, vol. 88, 1978, 88:38889b.

*Primary Examiner*—Michael R. Lusignan
*Attorney, Agent, or Firm*—Fleit & Jacobson

[57] ABSTRACT

The invention provides for a process for impregnating a cellulosic material, especially wood, to improve its resistance to moisture and to increase its dimensional stability, wherein the material is brought into contact with an agent comprising a silane of the formula:

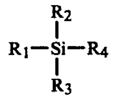

wherein $R_1$, $R_2$ and $R_3$ are same or different and are selected from the group comprising: alkoxy with 1 to 6 carbon atoms, and $R_4$ is equal to any of $R_1$, $R_2$ and $R_3$ or selected from the group comprising: alkyl and cycloalkyl with 1 to 6 carbon atoms, aryl, aralkyl and organofunctional radicals, or with a hydrolysate or hydrolysate-condensate of such silane. The invention also extends to products prepared by such process.

10 Claims, No Drawings

PROCESS FOR IMPREGNATING CELLULOSIC MATERIALS AND PRODUCTS HEREBY OBTAINED

TECHNICAL FIELD

The present invention relates to a process for the impregnation of cellulosic materials, especially wood, to improve their resistance to moisture and to increase their dimensional stability.

BACKGROUND ART

Among cellulosic materials wood is a very useful material which for its manufacture does not require large quantities of energy since it is formed in nature and since its processing is relatively simple. Wood possesses many advantages from the point of view of its use as a raw material and is thus easily machined, has a relatively high strength and good heat insulating properties, it is resistant to chemical attack etc. Wood is mostly used as a construction material for the manufacture of furniture, for domestic interior decoration and, of course, it is a highly important raw material for the building industry.

It is known that wood can decompose due to atmospheric conditions, uptake of water etc. and it is of importance to protect wood products by impregnating and/or surface treatment. Impregnation is a process whereby the pore system of the wood permanently or temporarily are filled with active substances in gas or liquid form. The surface treatment consists in the prevention of different types of surface coatings, such as paint, lacquer or the like.

A principal problem in using wood as a construction material resides in the fact that the wood by variations in moisture content is subjected to dimensional changes with disadvantageous results. Thus, fissures or cracks can form enabling transportation of moisture and spores resulting in for example attack by microorganisms. The dimensional instability can further result in damages to paint, interior decoration etc. Several attempts have been made to reduce the dimensional variations of wood due to variations in moisture content but so far with little or no success. Most of the known methods for treating wood and wood products have for a main purpose to eliminate the growth of microorganisms by the introduction of fungicides. Thus, the prior art methods have not for a main purpose to reduce or eliminate dimensional changes.

SUMMARY OF THE INVENTION

The present invention has for its purpose to provide a process for impregnation of cellulosic materials, particularly wood or wood products, to reduce or eliminate dimensional changes due to varying environmental conditions.

The present invention also relates to elimination or reduction of water uptake, thus improving the resistance to moisture attacks thereby impairing the conditions for microorganisms, such as fungi and the like.

Another object is to provide for an impregnating process whereby the treated material will be improved with regard to better adhesion to paint, resins etc.

As a result of research and experimentation it has now been found that cellulosic materials, especially wood and wood products, can be modified to obtain a significantly improved moisture resistance and dimensional stability by bringing the material into contact with an impregnating agent or composition comprising silane of the formula:

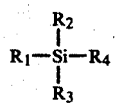

wherein $R_1$, $R_2$ and $R_3$ are same or different and are constituted by alkoxy with 1 to 6 carbon atoms, inclusive, and $R_4$ is equal to any of $R_1$, $R_2$ and $R_3$ or constituted by alkyl or cycloalkyl having 1 to 6 carbon atoms, inclusive, aryl, aralkyl or an organofunctional radical. The process of the invention is operable also by using an impregnating agent comprising a hydrolysate or hydrolysate-condensate of such silane or mixture of silanes.

It is preferred to use as an impregnating agent or composition a solution, a suspension or an emulsion of the silane or of the product derived therefrom. As a continuous phase or transport medium there may be used gases, such as air or water vapour, liquids, such as water, alcohols, such as lower alkanols with 1 to 4 carbon atoms, mixtures of water and such alcohols, light petrol, naphtha or other petroleum products, ligroin, esters, benzene, toluene, xylene, hydrocarbons and chlorinated hydrocarbons, tars, creosot oils etc.

A preferred impregnating composition is a solution of the silane or hydrolysate or hydrolysate-condensate thereof, but it is also conceivable in accordance with this invention to use a suspension or emulsion of the active ingredient. Particularly useful for impregnating solutions are lower alkanols, such as methyl or ethyl alcohol, isopropyl alcohol, light petrol or naphtha, tars and creosot oils.

Preferred silanes or products derived therefrom, as indicated above, are tetraalkoxy silanes, such as the ethyl ester of orthosilicic acid, i.e. tetraethoxysilane, wherein the above substituents $R_1$, $R_2$, $R_3$ and $R_4$ are all equal to $C_2H_5O$.

A particularly preferred hydrolysate-condensate for use in the impregnating composition are esters of different polysilicic acids, such as compounds of the following formula:

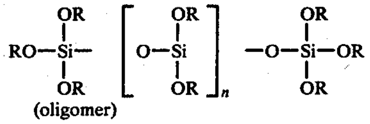

(oligomer)

wherein R indicates lower alkyl, i.e. alkyl having 1 to 6 carbon atoms, particularly 2 or 3 carbon atoms, and n is an integer from 2 to 8, inclusive. These types of compounds are mostly colourless liquids insoluble but hydrolysable in water but soluble in many organic solvents, such as aromatic solvents, chlorinated hydrocarbons, alkanols and hydrocarbons, tars and creosot oils.

Another preferred group of compounds for use as active ingredients in the impregnating composition are alkyl trialkoxysilanes, i.e. compounds where substituents $R_1$, $R_2$ and $R_3$ above stand for alkoxy groups, particularly methoxy or ethoxy groups, and $R_4$ stands for lower alkyl, such as methyl, propyl, ethyl etc. Hydrolysates and hydrolysate-condensates thereof are also, of course, useful and preferred.

In addition to improving the properties of cellulosic materials with regard to dimensional stability and other characteristics the process of this invention also enables treatment of for example wood and wood products to improve their affinity to paints, glues, resins, dyes etc. This is accomplished by using as an active ingredient in the impregnating composition a silane or hydrolysate or hydrolysate-condensate thereof wherein $R_4$ in the above formula is an organofunctional radical. This technique of improving adhesion of inorganic materials towards organic polymers is known but to the best of my knowledge have never been applied to cellulosic materials, such as wood. Examples of such silanes containing an organofunctional group are the following:

| Chemical name | Structure |
|---|---|
| Vinyltrimethoxysilane | $CH_2{=}CH{-}Si(OCH_3)_3$ |
| Vinyltriethoxysilane | $CH_2{=}CH{-}Si(OC_2H_5)_3$ |
| Vinyl-tris(β-methoxy-ethoxy)silane | $CH_2{=}CH{-}Si(OCH_2{-}CH_2{-}O{-}CH_3)_3$ |
| γ-methacryloxy-propyltri-methoxysilane | 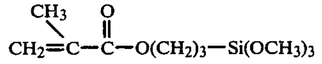 |
| γ-glycidyloxy-propyltri-methoxysilane | 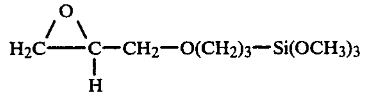 |

This new technique constitutes an important aspect of this invention significantly broadening the area of application of the invention.

It is to be noted that the process of the invention can be combined with known preservation and hydrophobation processes, such as treatment with silicons, fatty acid derivatives, oils, paraffines, waxes, tars, fungicides, insecticides, flame retardents etc.

The treatment according to the invention can be performed at normal temperature and pressure but it is conceivable and also frequently preferred to perform the process at increased temperatures, such as up to 150° C., for example at the normal drying temperature for wood products between about 40° and about 60° C. The impregnation can, of course, be operated at an increased or decreased pressure as is conventional in the known impregnation procedures. This is all per se conventional in the art and need no further detailed explanation.

It has been found that the impregnating process of this invention can be frequently optimized by using polymerization catalysts, i.e. agents improving polymerization and condensation of different preparations, as in the preparations of silicons.

Among such useful catalysts are the following types:

A first group of catalysts are those disclosed in for example Swedish Pat. No. 381,453 constituted by either organo-functional silanes with basic organo groups and/or alcoholates of silicon and/or metals from the first or the second principal group and the fourth of the fifth side group of the periodic system. A suitable example of such catalyst is γ-aminopropyltriethoxysilane,
$H_2N{-}CH_2{-}CH_2{-}CH_2{-}Si(OC_2H_5)_3$ A second group of catalysts of a conventional nature for operating and accelerating silane and silanol condensation and possible polymerisation are disclosed in U.S. Pat. No. 3,328,481, i.e. organic amines with a preferred dissociation constant of at least $10^{-10}$, preferably primary, secondary and tertiary amines.

A third group of catalysts for use in the process of this invention are also disclosed in said U.S. patent specification and can be described as condensation products of aliphatic aldehydes and aliphatic primary amines.

A fourth group of catalysts to be used in this invention are metal salts of carboxylic and polycarboxylic acids and hydroxy carboxylic acids. Metals used are inter alia lead, tin, nickel, cobolt, iron, cadmium, chromium, zinc, copper, manganese, aluminium, magnesium, barium, strontium, calcium, cecium, potassium, sodium, lithium, titanium, zirconium and vanadium. Examples of such catalysts are disclosed in Swiss patent specification No. 594576 where they, however, are used in a totally different context, namely in the preparation of a particular binder.

A fifth group of polymerization catalysts useful in this invention are metal oxides and organic peroxides.

A sixth group of agents useful in connection with this invention are so-called chelate complexes. A particular type of chelate complexes used in the manufacture of silicons are obtained by reaction of metal alcoholates and chelates such as betadiketones, betahydroxy or beta-aminoketones or betaketo esters, a process which is described in principal in Belgian patent specification No. B 564 179. All these catalysts are flexibly useful and are easily introduced into the solvent system used and certain catalysts may also be evaporized and transferred to the site in gas form. Moreover, most of the technically used fungicides are also polymerisation catalysts and thus useful in this invention.

Although the invention is not to be bound by any particular theory it is quite conceivable that the active ingredients used in the impregnating composition when operating the process of the invention will react with hydroxy groups of the cellulosic or lignine material to provide for some internal cross-linking in the material treated. Thus, it may well be that ester linkages may be formed between the silicon compounds from which alkoxy groups have been removed by hydrolyses and the hydroxy groups of the cellulosic material. This is a conceivable theory in view of the fact that the impregnation process of this invention results in products with significantly improved dimensional stability under varying humidity conditions and varying moisture contents.

EXAMPLES

The invention will now be further described by non-limiting examples.

EXAMPLE 1

In this example the test bodies used are wood pieces of Scotch fir, 70×70×10 mm. The wood is dried in the open air and contains on average 5 to 10 percent by weight of moisture. The pieces are squares with the smallest dimension, 10 mm, in the direction of the fibres.

The treating composition is prepared by dissolving the active ingredient, i.e. the silicon compound, in the solvent, which in this Example is absolute ethanol, naphtha or a mixture thereof.

The treatment is performed by letting the test bodies float on the solution prepared for a period of time of about 2 hours and at room temperature. The test bodies are then removed from the solution and examined with regard to absorbed quantity of liquid after treatment, remaining a quantity of liquid after drying in air at room temperature for 48 hours and 1 year, and percent circumferential expansion after treatment, i.e. expansion along the annual rings of the wood.

The active ingredients in this Example are a silane called Dynasylan ® BSM40, and ester in monomeric form called Dynasil ® A and and an oligomeric ester Dynasil ® 40, all sold by Dynamit Nobel Aktiengesellschaft, West Germany. Dynasylan ® BSM is an alkyltrialkoxysilane (probably propyl trimethoxy silane). The structures of Dynasil A and Dynasil 40 are stated to be the following:

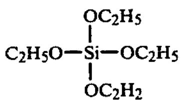

and

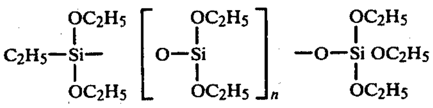

(n = 2-3)

respectively.

The test results from this Example are summarized in Table I as enclosed. In the Table, the control tests consist of treatment with water or ethanol only, whereas the other experiments exemplify treatments in accordance with this invention. In the Table, all percentages refer to volume except for, of course, the data on expansion.

As can be seen from the results of the Table certain compositions are solutions provided for almost no circumferential expansion at all. It seems that naphtha is an advantageous solvent, including a mixed solvent where naphtha is a major constituent.

EXAMPLE 2

The same type of test bodies as in Example 1 are used. The treating solution again contains Dynasylan BSM or Dynasil 40 and the treatment of the wood pieces is performed in the same manner as per Example 1 above but with a period of treatment of only 1 hour. After 2 weeks storage in open air at room temperature the impregnated test bodies are investigated and further tested with regard to water-uptake and circumferential expansion. The water-uptake experiment is performed by immersing the test bodies into water at a depth of 100 mms.

The experimental results are summarized in Table II as enclosed.

It is seen from the results that the water-uptake and the circumferential expansion are significantly reduced with regard to the test bodies treated in accordance with this invention.

EXAMPLE 3

The same types of test bodies as per Example 1 are again used. In this example the impregnating composition contains hydrolyzed Dynasil 40. The composition is prepared by stirring Dynasil 40 into aqueous ethanol (60% $C_2H_5OH$) containing sulphuric acid to a pH of about 5. After some time a clear solution is obtained containing the oligomeric ester in a hydrolyzed form.

The impregnation of the test bodies is performed in the same manner as in Example 2, and after treatment and 2 weeks storage the test bodies are investigated and tested with regard to water-uptake (floating on water) and circumferential expansion. The results obtained are summarized in Table III as enclosed. As can be seen from that table the results are significantly better with regard to the test bodies treated in accordance with this invention.

EXAMPLE 4

This example uses the same type of test bodies as in Example 1 above. The example is intended to illustrate the effect of repeated treatment with impregnating composition and also illustrates a comparison with conventional impregnation using 40% by volume zinc naphthenate dissolved in naphtha (Example No. 4:5).

The impregnating composition for applying the invention consists of 40% by volume solution of Dynasil A in absolute ethanol. The water-uptake of the test bodies takes place as per Example 1 but for a period of time of only 1 hour. The time interval between the two treatments in Examples 4:3 and 4:4 is 2 weeks and consists of drying in open air at room temperature. The testing has been performed on test bodies treated in accordance with the instant invention after a period of storage at room temperature and in open air of about 1 year.

The test results are summarized in Table IV as enclosed. From the table it can be seen that repeated treatment in accordance with the invention results in improvement regarding water-uptake and circumferential expansion. It can also be seen from the table that the conventional technique of impregnating the test bodies, i.e. using zinc naphthenate, is by far inferior to the results obtained by applying this invention and, in fact, it is only insignificantly better than the control.

EXAMPLE 5

This example uses the same type of test bodies as there is used in Example 1 above. The impregnating composition contains Dynasylan BSM and Dynasil 40 ("Silane" and "olig.ester"). Water-uptake and circumferential expansion are measured after storage in an atmosphere of 100% relative humidity and at a temperature of about 80° C. after 1 hour and after 24 hours.

The results are summarized in Table V as enclosed and the improvement by using this invention are obvious therefrom.

EXAMPLE 6

This example, using the same type of test bodies as Example 1, has for its purpose to illustrate the improvement in water-resistance of wood impregnated in accordance with the invention. The test bodies are impregnated with different compositions using Dynasylan BSM (silane), Dynasil A (monom.ester) and Dynasil 40 (olig.ester) and a hydrolysate of the last substance. The impregnation is performed in the same manner as per Example 1 above, and after about 2 weeks drying in open air and at room temperature the test bodies are subjected to experimentation. The experiment performed on the impregnated pieces of wood consists in applying one drop of water to one of the major surfaces of the piece of wood, i.e. to the surface containing the cut ends of the fibres, and the time interval for disappearance of the drop into the wood by absorption in seconds is measured and recorded. The results are summarized in Table VI as enclosed and it can be clearly seen from the results of the table that using the treatment of the invention results in a significant improvement of the water-resistance of the treated test bodies.

TABLE I

| Ex no | Treating agent: solvent (%) | silane (%) | ester (%): monomer | oligomer | Absorbed quantity of liquid (gs) | Remaining quantity (gs) after drying: 48 hrs | 1 year | % expansion after treatment |
|---|---|---|---|---|---|---|---|---|
| 1:1 (control) | — | — | — | — | 13 | 2 | 0 | 9.3 |
| 1:2[a] (control) | 100 | | | | 7 | 1 | 0 | 5.7 |
| 1:3[a] (control) | 60 | 40 | | | 8 | 2 | 1 | 5.0 |
| 1:4[a] (control) | 60 | 20 | | 20 | 8 | 6 | 3 | 4.3 |
| 1:5[a] (control) | 70 | | 30 | | 8 | 4 | 3 | 0.7 |
| 1:6[a] (control) | 60 | | | 40 | 8 | 7 | 5 | 0 |
| 1:7[a] (control) | 60 | 35 | 5 | | 8 | 3 | 2 | 5.7 |
| 1:8[b] (control) | 100 | | | | 7 | 3 | 0 | 0 |
| 1:9[b] (control) | | 100 | | | 6 | 3 | 2 | 0.7 |
| 1:10[b] (control) | 60 | 40 | | | 6 | 3 | 1 | 0 |
| 1:11[c] (control) | 80 | | | 20 | 6 | 4 | 2 | 0 |

[a]solvent used absolute $C_2H_5OH$
[b]solvent used naphtha
[c]solvent used 50% naphtha + 30% absolute $C_2H_5OH$

TABLE II

| Ex. no | Treating agent: solvent (%) | silane (%) | olig.ester (%) | Water up-take (gs) after (mins): 10 | 30 | 60 | % Expansion after: Water up-take 60 mins | Storage at 20° C. for: 24 hrs at 70% RH[x] | 100 hrs at 100% RH |
|---|---|---|---|---|---|---|---|---|---|
| 2:1 | — | — | — | saturation after 10 | | | 7.1 | 2.9 | 8.5 |
| 2:2[a] | 60 | 40 | | 3 | 4 | 5 | 2.9 | 0.7 | 5.0 |
| 2:3[b] | 60 | | 40 | 3 | 4 | 5 | 2.1 | 0.7 | 5.0 |

[a]solvent used naphtha, catalyst: 0.1% zirconium naphtenate (by weight)
[b]solvent used absolute $C_2H_5OH$ (no catalyst)
[x]RH = relative humidity.

TABLE III

| Ex. no | Treating agent: Solvent (%) | active ingredient | Water up-take (gs) after 1 hour (contact with water surface) | % Expansion after: Water up-take 60 mins | Storage at 20° C. and 100% RH: 24 hrs | 100 hrs |
|---|---|---|---|---|---|---|
| 3:1 | (control) | | 8 | 7.1 | 7.8 | 8.5 |
| 3:2 | $H_2O$/ $C_2H_5OH$ (1:4) | hydrolysate 20% | 4 | 3.5 | 4.2 | 5.7 |
| 3:3[x] | $H_2O$/ $C_2H_5OH$ (1:4) | hydrolysate 20% | 3 | 2.8 | 3.5 | 5.0 |

[x]with 0.1% cobalt octoate as a catalyst

TABLE IV

| Ex. no | Number of treatments | Water up-take (gs) after 1 hour | % Expansion after: Water up-take 1 hr | Storage at 20° C. for: 24 hrs at 70% RH | 100 hrs at 100% RH |
|---|---|---|---|---|---|
| 4:1 | (control) | 5 | 7.1 | 2.8 | 8.5 |
| 4:2[x] | 1 | 3 | 2.1 | 0.7 | 5.0 |
| 4:3 | 2 | 1 | 2.1 | 0 | 2.8 |
| 4:4[x] | 2 | 1 | 2.1 | 0 | 2.1 |
| 4:5 | 1 | 6 | 4.3 | 2.8 | 7.1 |

[x]with 0.1% zinc naphtenate as a catalyst

TABLE V

| Ex. no | Treating agent: solvent (%) | silane (%) | olig. ester (%) | Water up-take after: 1 hr | 24 hrs | % Expansion after: 1 hr | 24 hrs |
|---|---|---|---|---|---|---|---|
| 5:1 | | (control) | | 1 | 3 | 3.5 | 6.4 |
| 5:2 | 60[a] | | 40 | 1 | 3 | 2.1 | 3.5 |
| 5:3 | 60[b] | 40 | | 1 | 3 | 2.1 | 3.5 |
| 5:4 | 60[c] | 20 | 20 | 1 | 3 | 2.1 | 3.5 |

TABLE V-continued

[a]solvent used absolute ethanol
[b]solvent used naphtha
[c]solvent used a + b, 1:1 by volume

TABLE VI

| Ex. no | Treating agent: solvent (%) | silane (%) | monom. ester (%) | olig. ester (%) | Catalyst | Period for disappearance of drop, secs: sap-wood | heart-wood |
|---|---|---|---|---|---|---|---|
| 6:1 | | (control) | | | − | 5–20 | 180–240 |
| 6:2[a] | 60 | 40 | | | + | >3600 | >3600 |
| 6:3[b] | 60 | 20 | 20 | | − | >3600 | >3600 |
| 6:4[c] | 60 | 24 | 16 | | + | >3600 | >3600 |
| 6:5[d] | 60 | | 40 | | + | 2700 | >3600 |
| 6:6[d] | 60 | | | 40 | − | >3600 | >3600 |
| 6:7[d] | 80 | | | 20 | + | >3600 | >3600 |
| 6:8[e] | 80 | | | 20[x] | − | 1200 | >3600 |
| 6:9[e] | 80 | | | 20[x] | + | 1500 | >3600 |
| 6:10[f] | 80 | 20 | | | + | >3600 | >3600 |

[x]hydrolysate according to Ex. 3
[a]solvent used naphta
[b]solvent used naphta + ethanol (1:1 by vol.)
[c]solvent used acetone + ethanol (1:1 by vol.)
[d]solvent used ethanol
[e]solvent used ethanol + $H_2O$ (7:3 by vol.)
[f]tar

I claim:

1. A process for impregnating wood, to improve its resistance to moisture and to increase its dimensional stability, comprising bringing the material into contact with an agent comprising a silane of the formula:

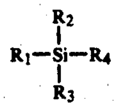

wherein $R_1$, $R_2$ and $R_3$ are same or different and are selected from the group consisting of alkoxy with 1 to 6 carbon atoms, and $R_4$ is equal to any of $R_1$, $R_2$ and $R_3$ or selected from the group consisting of alkyl and cycloalkyl with 1 to 6 carbon atoms, aryl, aralkyl and organofunctional radicals, in the presence of a polymerization catalyst.

2. A process according to claim 1, characterized by bringing the material into contact with an impregnating agent consisting of a solution, suspension or emulsion of the silane.

3. A process according to claim 2, characterized by using a treating agent containing as a continuous phase water, a lower alkanol, light petrol, naphtha, tars, creosot oils or mixtures thereof.

4. A process according to claims 1, 2 or 3, characterized by performing the impregnation with an agent comprising a tetra alkoxy silane.

5. A process according to claim 4 wherein the tetraalkoxy silane is an ethoxy silane.

6. A process according to claims 1, 2 or 3, characterized by performing the impregnation with an agent comprising a trialkoxyalkyl silane.

7. A process according to claim 6, wherein the alkoxy units if the silane have 1 or 2 carbon atoms.

8. A process according to claim 1, 2, 3, 4, 5, 6 or 7, characterized by using a solution of the agent for the impregnation.

9. Products prepared by the process of claim 1, 2, 3, 4, 5, 6, 7 or 8.

10. A process for impregnating wood, to improve its resistance to moisture and increase its dimensional stability, consisting essentially of bringing the material into contact with an agent comprising a silane of the formula:

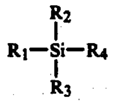

wherein $R_1$, $R_2$, and $R_3$ are same or different and are selected from the group consisting of alkoxy with 1 to 6 carbon atoms, and $R_4$ is equal to any of $R_1$, $R_2$ and $R_3$ or selected from the group consisting of alkyl and cycloalkyl with 1 to 6 carbon atoms, aryl, aralkyl and organofunctional radicals, in the presence of a polymerization catalyst.

* * * * *